(12) United States Patent
Takezaki (10) Patent No.: US 7,737,981 B2
(45) Date of Patent: Jun. 15, 2010

(54) INFORMATION PROCESSING APPARATUS

(75) Inventor: Satoshi Takezaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/246,942

(22) Filed: Oct. 7, 2008

(65) Prior Publication Data

US 2009/0160853 A1    Jun. 25, 2009

(30) Foreign Application Priority Data

Dec. 21, 2007    (JP)    ............................. 2007-330443

(51) Int. Cl.
  *G06F 15/16*    (2006.01)
  *G06F 15/80*    (2006.01)
(52) U.S. Cl. ...................... 345/502; 345/503; 345/504; 345/505
(58) Field of Classification Search .......... 345/502–505
  See application file for complete search history.

(56) References Cited

U.S. PATENT DOCUMENTS

| 7,466,316 B1 * | 12/2008 | Alben et al. ................. 345/502 |
| 2007/0013702 A1 | 1/2007 | Hiroi et al. |
| 2008/0303833 A1 * | 12/2008 | Swift et al. ................. 345/505 |

FOREIGN PATENT DOCUMENTS

| JP | 2007-48269 | 2/2007 |
| JP | 2007-316859 | 12/2007 |

OTHER PUBLICATIONS

An English Translation of Notice of Reasons for Rejection issued by the Japan Patent Office on Jan. 6, 2009.

* cited by examiner

*Primary Examiner*—Hau H Nguyen
(74) *Attorney, Agent, or Firm*—Knobbe, Martens Olson & Bear LLP (57) ABSTRACT

According to one embodiment, an information processing apparatus includes: a plurality of graphics processing units (GPUs) having different characteristics; a memory configured to store information on association between one of the plurality of GPUs and an application program; and a drawing control unit configured to control the GPU associated with the application program to perform drawing processing when the application program is run.

2 Claims, 7 Drawing Sheets

| DRAWING PROCESSING | 2D FACTOR | 3D FACTOR | MOVING PICTURE FACTOR |
|---|---|---|---|
| PROCESSING A | 0 | 3.0 | 2.0 |
| PROCESSING B | 2.0 | 0 | 3.0 |
| PROCESSING C | 0 | 2.0 | 0 |
| . . . | . . . | . . . | . . . |

APPLICATION PROGRAM

FUNCTION 1 (PROCESSING A)
FUNCTION 2 (PROCESSING B)
FUNCTION 3 (PROCESSING A AND PROCESSING B)
. . .
. . .

FIG. 9

INFORMATION PROCESSING APPARATUS

CROSS-REFERENCE TO RELATED APPLICATIONS

This application is based upon and claims the benefit of priority from Japanese Patent Application No. 2007-330443, filed on Dec. 21, 2007, the entire contents of which are incorporated herein by reference.

BACKGROUND

1. Field

One embodiment of the invention relates to an information processing apparatus including a plurality of GPUs having different characteristics, and particularly, an information processing apparatus which is capable of changing GPUs based on a type of drawing processing in performing the drawing processing.

2. Description of the Related Art

In recent years, as high quality moving pictures are run or 3D games with complicated drawn 3D screens are run at information processing apparatuses such as personal computers (PCs), there have been proposed information processing apparatuses having two or more graphics processing units (GPUs) or a dual GPU for a purpose of improving drawing capability.

As one example, JP-A-2007-48269 discloses a drawing method giving flexibility to development of graphic chips. This drawing method is to draw data using two cooperating GPUs having different new and old architectures for the purpose of providing compatibility. More specifically, in this drawing method, a first GPU performs a drawing processing for data supplied from a second GPU via a data input/output interface and returns the drawn data to the second GPU via the data input/output interface. Then, the second GPU processing the data from the first GPU if necessary and outputs a digital video signal to the outside.

An information processing apparatus having a plurality of GPUs having the same level of function typically divides a picture into a plurality of regions to be assigned to the plurality of GPUs, respectively, and performs a drawing processing for the regions by causing corresponding GPUs to draw their respective regions. In the meantime, although various types of application programs run at information processing apparatuses have been developed, there is necessity of high speed drawing processing irrespective of the type of drawing processing in order to allow various types of drawing processing such as 3D operation, moving picture processing, etc.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes: a plurality of graphics processing units (GPUs) having different characteristics; a memory configured to store information on association between one of the plurality of GPUs and an application program; and a drawing control unit configured to control the GPU associated with the application program to perform drawing processing when the application program is run.

First Embodiment

Figure 1:
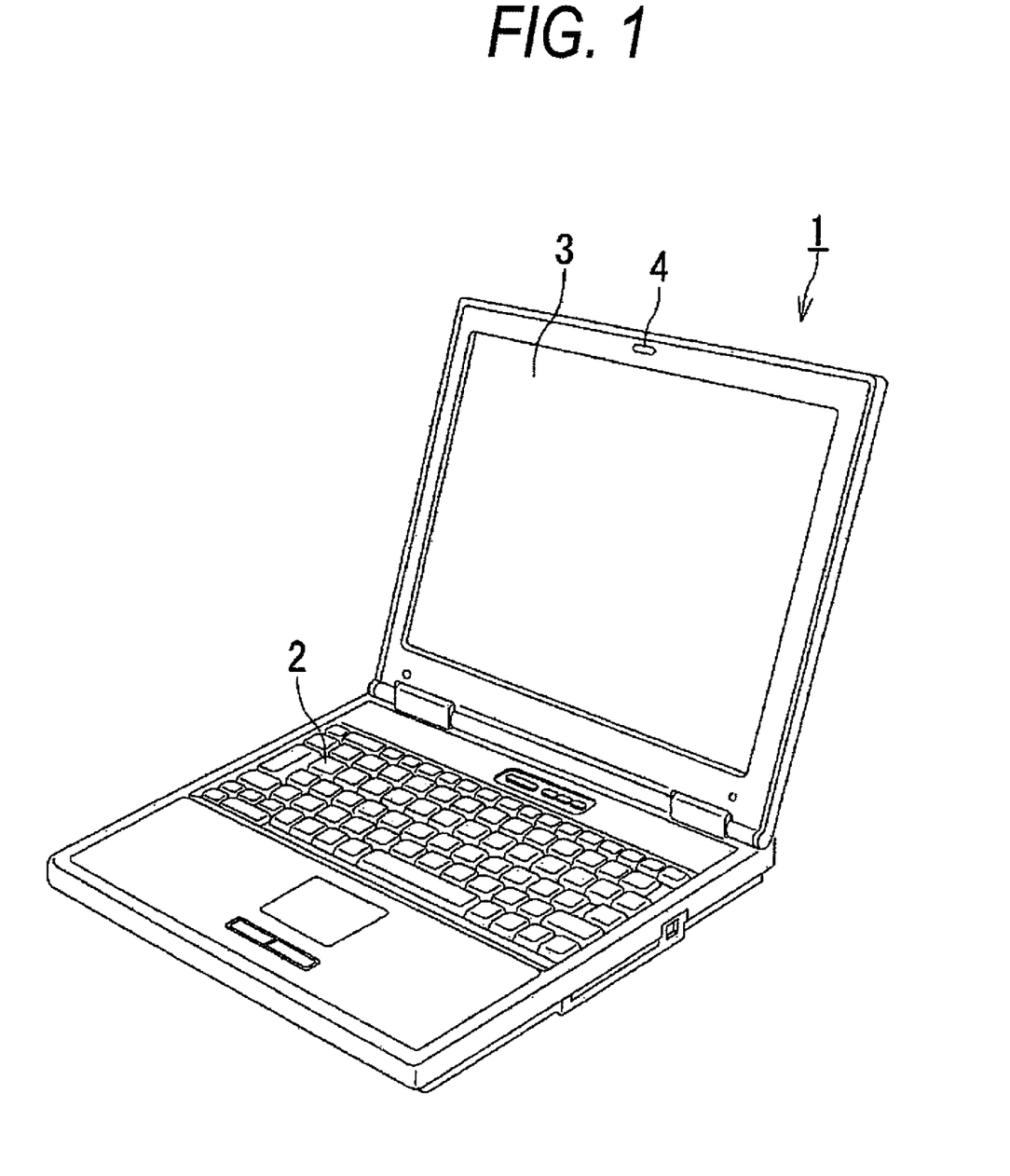
FIG. 1 is an exemplary perspective view showing an information processing apparatus according to an embodiment of the present invention.

Hereinafter, an information processing apparatus according to a first embodiment of the present invention will be described with reference to the accompanying drawings. FIG. 1 is an exemplary perspective view showing an information processing apparatus 1 according to a first embodiment of the present invention. As shown in FIG. 1, the information processing apparatus 1, which is a notebook personal computer (PC) or the like used in common, includes a keyboard 2 for input of instructions by a user, a liquid crystal display 3 for display of pictures including characters, figures, etc., and a speaker 4 for output of voice.

Figure 2:
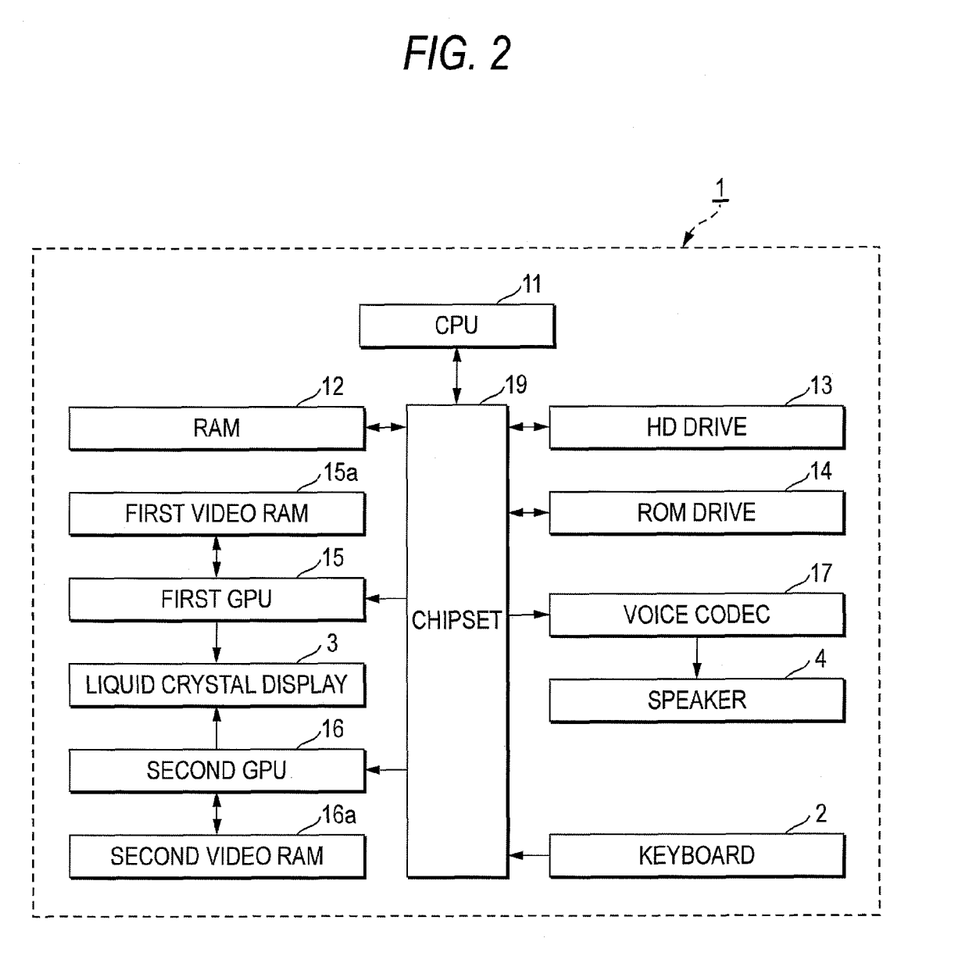
FIG. 2 is an exemplary block diagram showing the information processing apparatus.

FIG. 2 is an exemplary block diagram showing the information processing apparatus 1. As shown in FIG. 2, the information processing apparatus 1 includes a Central Processing Unit (CPU) 11, a Random Access Memory (RAM) 12, a Hard Disk (HD) drive 13, a Read Only Memory (ROM) drive 14, a first GPU 15, a second GPU 16 and a voice codec 17, all of which are interconnected by a chipset 19.

The CPU 11 controls the entire operation of the information processing apparatus 1 and performs a drawing processing, which will be described later, and other various arithmetic and control processing. In addition, the CPU 11 has an input interface to input devices such as the keyboard 2, a mouse connected externally, etc., and performs various processing based on signal inputted through these input devices. The RAM 12 is a work area for processing by the CPU 11 and temporarily stores data required for the processing. The HD drive 13 is a driving device to perform a read/write operation for a Hard Disk (HD) in which processing programs for processing by the CPU 11 and data required for the processing are stored. The ROM drive 14 is a driving device to perform a read/write operation for a recording medium, such as Digital Versatile Disk (DVD) or the like, in which video data and so on are stored.

The first GPU 15 includes a display interface for display of document data and image data on the liquid crystal display 3 and a first video RAM 15a used to temporarily store character and graphic data to be displayed on the liquid crystal display 3 and to process two dimensional graphics (2D) or three dimensional graphics (3D) and moving pictures. The first GPU 15 performs a drawing processing to display frame data loaded in the first video RAM 15a on the liquid crystal display 3 under control of the CPU 11.

Like the first GPU 15, the second GPU 16 includes a display interface for display of document data and image data on the liquid crystal display 3 and a second video RAM 16a, and performs a drawing processing to display frame data loaded in the second video RAM 16a on the liquid crystal display 3 under control of the CPU 11.

It is here noted that the first GPU 15 is different in characteristic from the second GPU 16 in that the first GPU 15 is excellent in a 2D or 3D processing and can perform 2D or 3D processing at a high speed while the second GPU 16 can perform moving picture processing at a high speed and with high quality.

The voice codec 17 has an output interface for output of voice to the speaker 4 incorporated in the information processing apparatus 1, converts digital voice signal into an analog signal and outputs the analog signal as voice through the speaker 4 under control of the CPU 11.

The chipset 19 is an integrated circuit having a memory controller, a bus bridge, an Integrated Drive Electronics (IDE) controller, various types of I/O controllers, etc.

Figure 3:
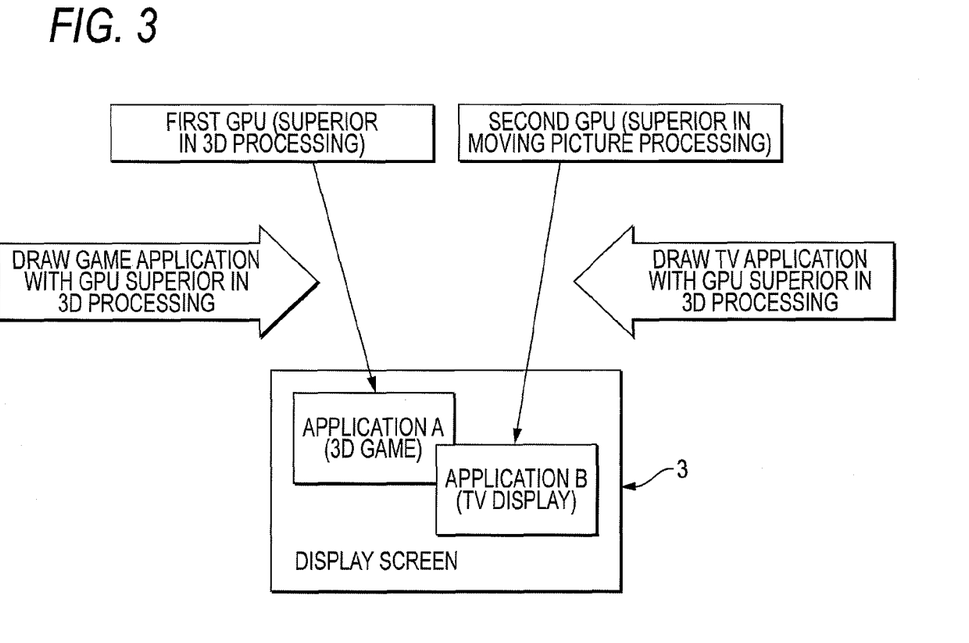
FIG. 3 is an exemplary view for explaining drawing processing in the information processing apparatus.

As shown in FIG. 3, the information processing apparatus 1 includes the first GPU 15 superior in the 2D or 3D processing and the second GPU 16 superior in the moving picture process. In the information processing apparatus 1, for example when an application program for "3D game" including much 3D processing is performed, the first GPU 15 superior in the 3D processing performs a drawing processing. On the other hand, when the information processing apparatus 1 performs an application program for "TV display" including much moving picture processing, the second GPU 16 superior in the moving picture processing performs a drawing processing.

Figure 4:
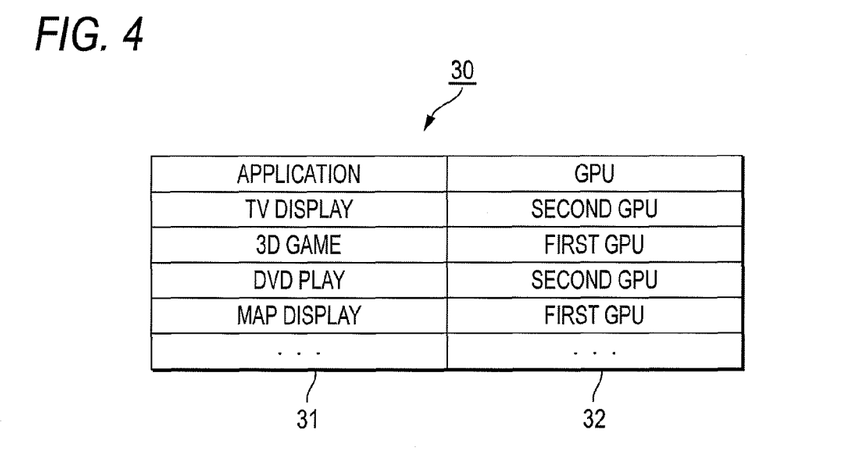
FIG. 4 is a view showing a data structure as an example of correspondence table information.

The HD drive 13 of the information processing apparatus 1 stores correspondence table information 30 to associate application programs with corresponding GPUs appropriate for processing of the application programs. As shown in FIG. 4, the correspondence table information 30 is information to associate application program information 31 indicating the application programs with GPU information 32 indicating one of the plurality of GPUs in the information processing apparatus 1. The information processing apparatus 1 determines a GPU to be used based on the GPU information 32 associated with the application program information 31 when the application programs are run.

For example, according to the correspondence table information 30 shown in FIG. 4, an application program for "TV display" is associated with the second GPU 16, an application program for "3D game" with the first GPU 15, an application program for "DVD play" with the second GPU 16, and an application program for "map display" with the first GPU 15. Accordingly, in the information processing apparatus 1, for example when the application program for "TV display" is run, the second GPU 15 is used to perform drawing processing for the liquid crystal display 2.

It is here assumed that the correspondence table information 30 is preset by a user and pre-stored in the HD drive 13. In addition, this conversion information (correspondence table information) 30 may be randomly updated by the user through the input device 21 and re-stored in the HD drive 13. In addition, when an application program is run in the information processing apparatus 1, a GPU most appropriate for the processing of this application program is selected and the selected GPU may be added to the correspondence table information 30 in association with the application program.

Figure 5:
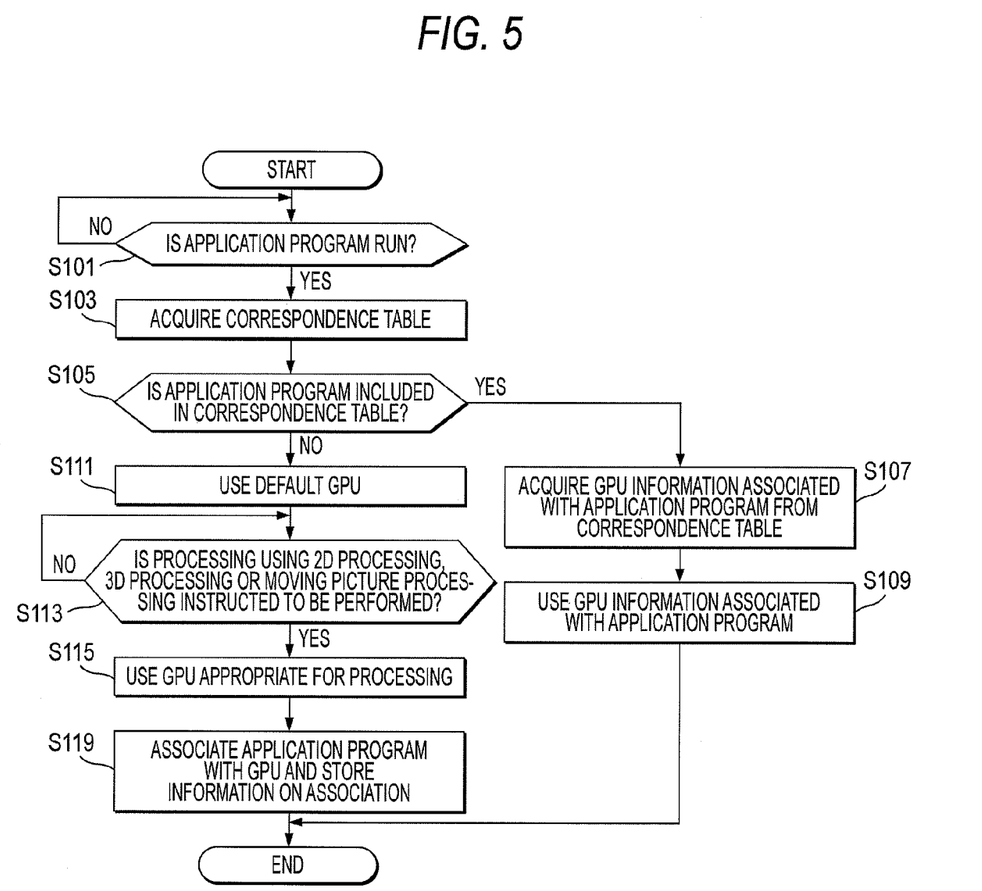
FIG. 5 is an exemplary flow chart showing a sequence of the drawing processing by the information processing apparatus.

Now, the information processing apparatus 1 according to the first embodiment will be described with reference to FIG. 5. For example when a user runs an application program at the input device such as the keyboard 2 or the like, the information processing apparatus 1 selects a GPU most appropriate for this application program and uses the selected GPU to perform drawing processing for the liquid crystal display 3. Hereinafter, a sequence of the drawing processing by the information processing apparatus 1 will be described based on a flow chart illustrated in FIG. 5. In the following description about the flow chart, the word "Step" in procedures of the flow chart will be omitted, such as abbreviating "Step S101" as "S101", for the sake of convenience.

First, the CPU 11 determines whether or not an application program is run (S101). If it is determined that any application program is not run (No in S101), the CPU 11 waits. If it is determined that an application program is run (Yes in S101), the CPU 11 acquires the correspondence table information 30 from the HD drive 13 (S103).

Next, the CPU 11 determines whether or not the application program run in S101 is included in the application information 31 of the correspondence table information 30 (S105). If it is determined that the run application program is included in the correspondence table information 30 (Yes in S105), the CPU 11 acquires the GPU information 32 in the correspondence table information 30 (S107), the GPU information 32 being associated with the application program run in Step S101. Next, the CPU 11 uses a GPU, which is indicated by the GPU information 32 acquired in S107, to perform drawing processing included in the application program (s109). Thus, when the application program is run in the information processing apparatus 1, the GPU most appropriate for this application program is used to perform drawing processing.

For example, when an application program for "TV display" is run in S101, the GPU information 32 indicating "second GPU" is acquired from the correspondence table information 30 in S107 and the second GPU 16 is used to perform drawing processing in S109. As another example, when an application program for "3D display" is run in S101, the GPU information 32 indicating "first GPU" is acquired from the correspondence table information 30 in S107 and the first GPU 15 is used to perform drawing processing in S109.

If the run application program is not included in the correspondence table information 30 (No in S105), the CPU 11 uses a default GPU to perform drawing processing included in the application program (S111). If one of the first GPU 15 and the second GPU 16 is set to have a default value stored in the HD drive 13 and a GPU most appropriate for the run application program can not be definitely determined, the default GPU may be used to perform drawing processing.

Next, the CPU 11 determines whether or not drawing processing using 2D or 3D processing or moving picture processing is performed by the application program run in S101 (S113). If it is determined that the drawing processing using the 2D or 3D processing or the moving picture processing is not run (No in S113), the CPU 11 continues to use the default GPU being used in S111.

If the drawing processing using the 2D or 3D processing or the moving picture processing is instructed to be run (Yes in S113), the CPU 11 uses the GPU most appropriate for performing the instructed drawing processing (S115). For example, if the 3D processing is instructed to be performed, the CPU 11 uses the first GPU 15 superior in the 3D processing to perform drawing processing. If the moving picture processing is instructed to be performed, the CPU 11 uses the second GPU 16 superior in the moving picture processing to perform drawing processing. Accordingly, when the drawing processing is performed in the information processing apparatus 1, the GPU most appropriate for this drawing processing is used to perform the drawing processing.

Next, the CPU 11 stores the correspondence table information 30, which associates the application program run in S101 with the GPU used in S115, in the HD drive 13 (S119). Accordingly, when a next application program is run, the CPU 11 can select a GPU to be used based on the correspondence table information 30.

In this manner, the information processing apparatus 1 has the plurality of GPUs having different characteristics and, upon running an application program, if the application program is associated with a GPU most appropriate for the application program by the correspondence table information 30, uses the GPU to perform drawing processing. If not associated, a GPU superior in the 2D processing is used for the 2D processing required, a GPU superior in the 3D processing is used for the 3D processing required, and a GPU superior in the moving picture processing is used for the moving picture processing required, in order to perform their respective drawing processing. Accordingly, in the information processing apparatus having the plurality of types of GPUs, when an application program requiring much computational power for drawing processing such as the 3D processing, the moving picture processing, etc. is run, it is possible to increase an operation speed for the drawing processing by using a GPU most appropriate for the drawing processing.

In addition, assuming that an application program includes information on GPUs in advance, the CPU 11 may select a GPU based on the information and control the selected GPU to perform the drawing processing. In this case, instead of using the default GPU in S111, the information on a GPU may be acquired from the application program and the GPU may be used.

With the information processing apparatus 1 according to the first embodiment, by selecting a GPU to perform drawing processing among a plurality of GPUs having different characteristics, based on the type of drawing processing such as 2D processing, 3D processing, moving picture processing, etc., it is possible to perform high performance and high quality drawing processing irrespective of the type of drawing processing.

Second Embodiment

Figure 6:
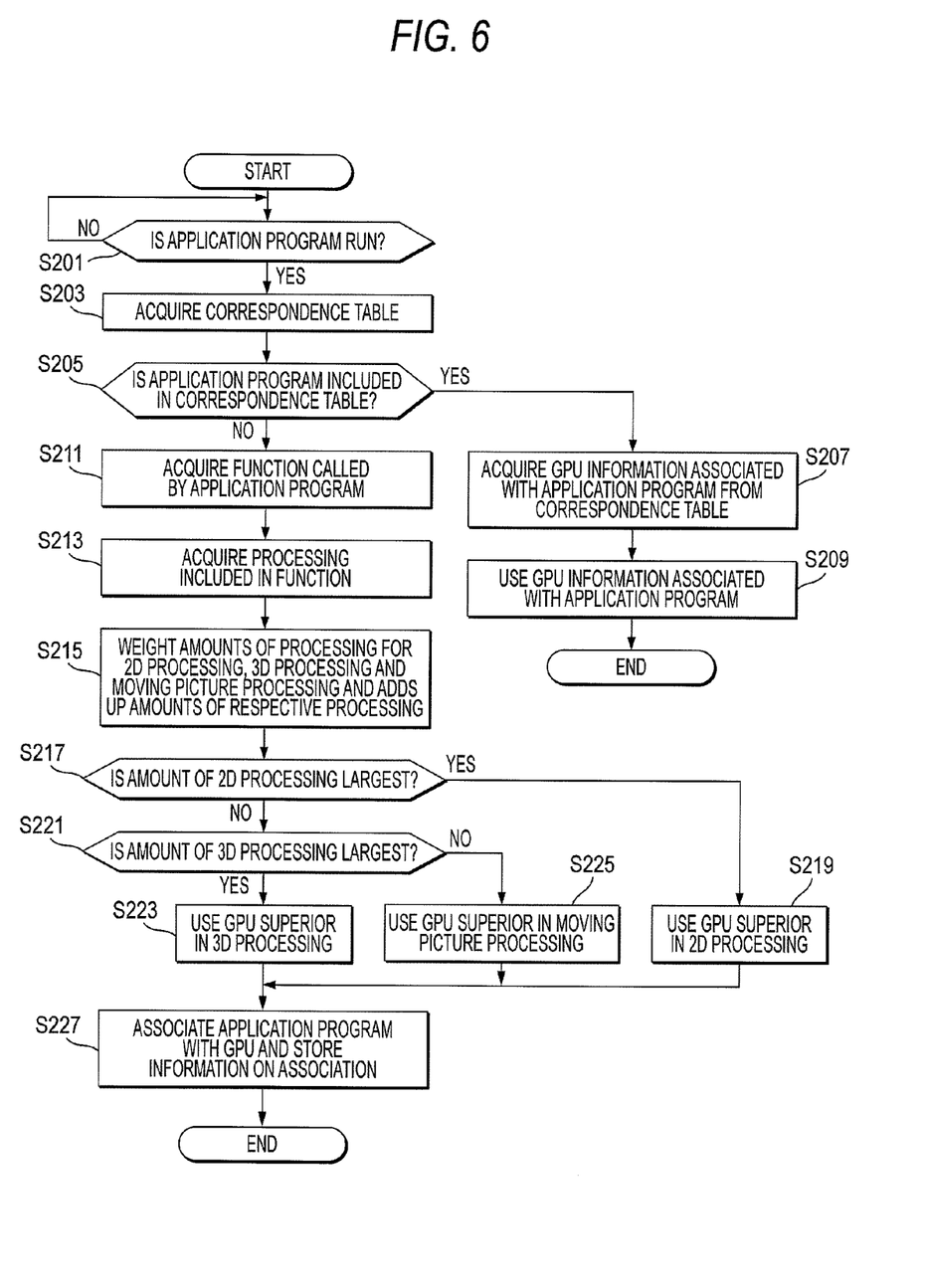
FIG. 6 is an exemplary flow chart showing a sequence of the drawing processing by the information processing apparatus.

Next, an information processing apparatus according to a second embodiment of the present invention will be described with reference to FIGS. 6 to 8. The information processing apparatus 1 according to the second embodiment analyzes an application program run by a user at the keyboard 2 or the like, selects a GPU most appropriate for the application program based on a result of the analysis, and uses the selected GPU to perform drawing processing for the liquid crystal display 3.

The information processing apparatus 1 of the second embodiment has the same configuration and function as the information processing apparatus 1 of the first embodiment. That is, as shown in FIG. 1, the information processing apparatus 1, which is a notebook PC or the like used in common, includes the keyboard 2 for input of instructions by a user, the liquid crystal display 3 for display of pictures including characters, figures, etc., and the speaker 4 for output of voice.

In addition, as shown in FIG. 2, like the information processing apparatus 1 of the first embodiment, the information processing apparatus 1 of the second embodiment includes the Central Processing Unit (CPU) 11, the Random Access Memory (RAM) 12, the Hard Disk (HD) drive 13, the Read Only Memory (ROM) drive 14, the first GPU 15, the second GPU 16 and the voice codec 17, all of which are interconnected by the chipset 19.

The HD drive 13 of the information processing apparatus 1 stores weight information 40 used to analyze an application program. As shown in FIG. 7, the weight information 40 is information that associates drawing processing information 41 indicating drawing processing with 2D factor information 42 indicating weight for 2D process, 3D factor information 43 indicating weight for 3D process, and moving picture factor information 44 indicating weight for moving picture process.

A drawing processing refers to processing such as, for example, "drawing a circle", "drawing a rectangle", etc. having different characteristics including "much 2D processing", "much 3D processing", "much 3D and moving picture processing", etc. The weight information 40 is information indicating such characteristics of drawing processing.

Figure 7:
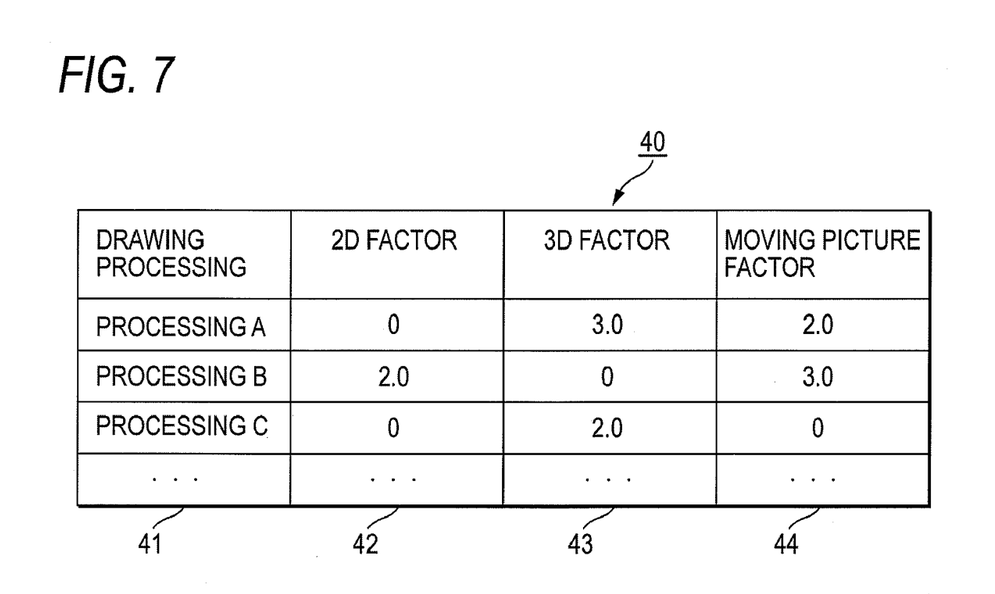
FIG. 7 is a view showing a data structure as an example of weight information.
Figure 8:
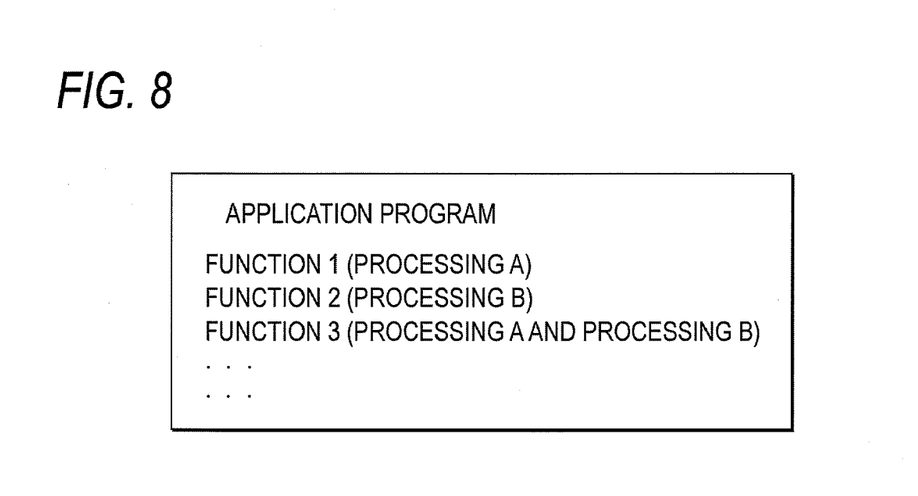
FIG. 8 is a view showing an example of a configuration of an application program.

For example, as shown in FIG. 7, processing A is associated with a 2D factor "0", a 3D factor "3.0", and a moving picture factor "2.0", processing B is associated with a 2D factor "2.0", a 3D factor "0", and a moving picture factor "3.0", and processing C is associated with a 2D factor "0", a 3D factor "2.0", and a moving picture factor "0". For example, in case of the processing A, this means that the processing A is given the largest weight for 3D processing and the next largest weight for moving picture processing.

Using the weight information 40, the information processing apparatus 1 selects a GPU based on contents of processing performed by an application program and uses the selected GPU to perform drawing processing. Now, a sequence of the drawing processing by the information processing apparatus 1 will be described with reference to a flow chart illustrated in FIG. 6.

First, the CPU 11 determines whether or not an application program is run (S201). If it is determined that any application program is not run (No in S201), the CPU 11 waits. If it is determined that an application program is run (Yes in S201), the CPU 11 acquires the correspondence table information 30 from the HD drive 13 (S203).

Next, the CPU 11 determines whether or not the application program run in S201 is included in the application information 31 of the correspondence table information 30 (S205). If it is determined that the run application program is included in the correspondence table information 30 (Yes in S205), the CPU 11 acquires the GPU information 32 in the correspondence table information 30 (S207), the GPU information 32 being associated with the application program run in Step S201. Next, the CPU 11 uses a GPU, which is indicated by the GPU information 32 acquired in S207, to perform drawing processing included in the application program (S209). Thus, when the application program is run in the information processing apparatus 1, the GPU most appropriate for this application program is used to perform drawing processing.

If it is determined that the run application program is not included in the correspondence table information 30 (No in S205), the CPU 11 acquires functions called by the run application program (S211). That is, for the application program, as shown in FIG. 8, a plurality of functions including different processing such as processing A, processing B, processing C, etc. are listed and the CPU 11 acquires these functions.

The CPU 11 acquires processing performed by each of the function acquired in S211 (S213). For example, as shown in FIG. 8, function 1 includes the processing A, function 2 includes the processing B, and function 3 includes the processing A and the processing C. This means that the processing A is performed when function 1 is called by the application program, the processing B is performed when function 2 is called, and the processing A and the processing C are performed when function 3 is called.

The CPU 11 gives weights for 2D processing, 3D processing and moving picture processing to the processing acquired in S213, respectively, and adds up the amounts that represents computational power required for respective processing (S215). That is, the CPU 11 acquires the 2D factor information 42, the 3D factor information 43, and the moving picture factor information 44 for the processing, which were acquired in S213, from the weight information 40. Then, the CPU 11 weights the amounts of respective processing using the 2D factor information 42, the 3D factor information 43, and the moving picture factor information 44 and then calculates the amount of 2D processing, the amount of 3D processing and the amount of moving processing.

For example, for the application program, if the processing A is performed one time, the processing B is performed two times, and the processing C is performed three times, the amount of 2D processing amounts to 4 (=2D factor for processing A×1+2D factor for processing B×2+2D factor for processing C×3=0×1+2.0×2+0×3). The amount of 3D processing amounts to 9 (=3D factor for processing A×1+3D factor for processing B×2+3D factor for processing C×3=3.0×1+0×2+2.0×3). The amount of moving picture processing amounts to 8 (=moving picture factor for processing A×1+moving picture factor for processing B×2+moving picture factor for processing C×3=2.0×1+3.0×2+0×3). Accordingly, when the processing A is performed one time, the processing B is performed two times, and the processing C is performed three times, the amount of 3D processing is largest.

Next, the CPU 11 determines whether or not the amount of 2D processing is largest among the amount of 2D processing, the amount of 3D processing and the amount of moving picture processing added up in S215 (S217). If it is determined that the amount of 2D processing is largest (Yes in S217), the CPU 11 uses the first GPU 15 superior in 2D processing to perform drawing processing (S219).

Next, the CPU 11 determines whether or not the amount of 3D processing is largest among the amount of 2D processing, the amount of 3D processing and the amount of moving picture processing added up in S217 (S221). If it is determined that the amount of 3D processing is largest (Yes in S221), the CPU 11 uses the first GPU 15 superior in 3D processing to perform drawing processing (S223).

Next, if it is determined that neither of the amount of 2D processing and the amount of 3D processing is largest, that is, the amount of moving picture processing is largest (No in S221), the CPU 11 uses the second GPU 16 superior in moving picture processing to perform drawing processing (S223).

Next, the CPU 11 stores the correspondence table information 30, which associates the application program run in S201 with the GPU used in S219, S223 or S225, in the HD drive 13 (S227). Accordingly, when a next application program is run, the CPU 11 can select a GPU to be used based on the correspondence table information 30.

In this manner, the information processing apparatus 1 has the plurality of GPUs having different characteristics and, upon running an application program, if the application program is associated with a GPU most appropriate for the application program by the correspondence table information 30, uses the GPU to perform drawing processing. If not associated, the amount of 2D processing, the amount of 3D processing and the amount of moving picture processing are calculated and a GPU having the largest amount of processing is used to perform drawing processing.

With the information processing apparatus 1 according to the second embodiment, by analyzing an application program to find the type of drawing processing having the largest amount of processing and then selecting a GPU to perform drawing processing among a plurality of GPUs having different characteristics, based on the found type of drawing processing, it is possible to perform high performance and high quality drawing processing irrespective of the type of drawing processing.

While it has been illustrated in the first and second embodiments that the information processing apparatus 1 has the first GPU superior in 2D and 3D processing and the second GPU superior in moving picture processing, the information processing apparatus 1 is not limited to this but may have different GPUs having different three or more characteristics.

Figure 9:
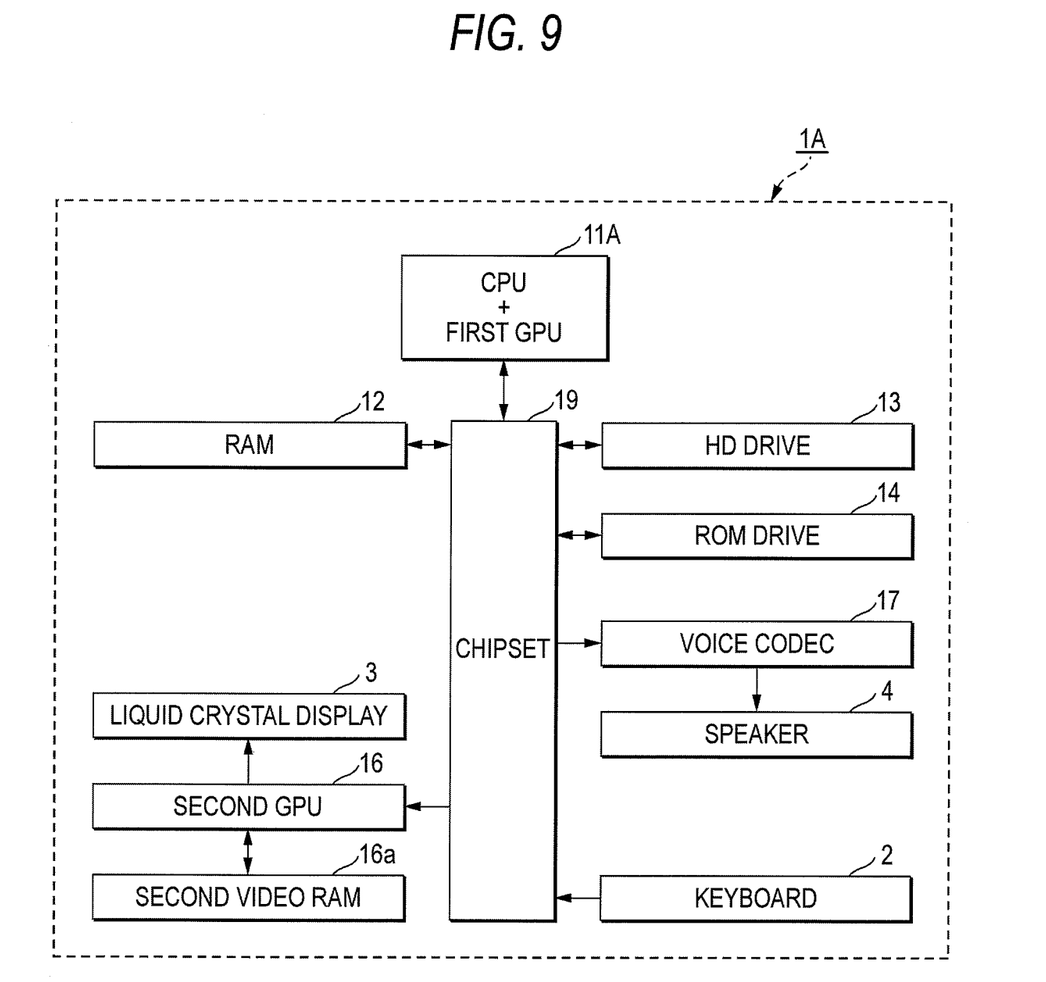
FIG. 9 is an exemplary block diagram showing an information processing apparatus according to another embodiment of the present invention.

In addition, while it has been illustrated in the above embodiments that the information processing apparatus 1 is configured such that the CPU 11, the first GPU 15 and the second GPU 16 are separately connected to the chipset 19, an information processing apparatus 1A may be configured such that a CPU 11A incorporates the first GPU and the CPU 11A and the second GPU 16 are separately connected to the chipset 19, as shown in FIG. 9.

Further, while it has been illustrated in the above embodiments that functions of the invention are stored in advance in the information processing apparatus 1, the present invention is not limited to this, but the same functions may be downloaded from a network to the apparatus 1 or a recording medium having the same functions recorded therein may be installed within the apparatus 1. The recording medium may be, for example, a CD-ROM or other medium without any limitation as long as it can store any programs and is accessible and readable by the apparatus 1.

What is claimed is:

1. An information processing apparatus comprising:
   an extracting module configured to extract a plurality of drawing processes to be performed in an application program when the application program is run;
   a determining module configured to calculate computational power required for each type of drawing processes extracted by the extracting module and to determine the type of drawing process consuming substantial computational power;
   a drawing control module configured to select a GPU based on the type of drawing process consuming the substantial computational power determined by the determining module, and to control the selected GPU to perform the plurality of drawing processes; and
   a memory configured to store information on association between the selected GPU and the application program when the application program is run; wherein
   the drawing control module is configured to select the GPU associated with the application program based on the determined computational power based upon the information associated with the application program if stored in the memory.

2. The apparatus of claim 1,
   wherein the type of drawing processing comprises at least one of three-dimensional graphics process and moving picture process.

* * * * *